United States Patent [19]

LaSota

[11] Patent Number: 4,894,995
[45] Date of Patent: Jan. 23, 1990

[54] COMBINED INTERNAL COMBUSTION AND HOT GAS ENGINE

[75] Inventor: Lawrence LaSota, 15745 N. Park, E. Detroit, Mich. 48021

[73] Assignee: Lawrence LaSota, E. Detroit, Mich.

[21] Appl. No.: 354,836

[22] Filed: May 22, 1989

[51] Int. Cl.[4] .......................................... F01B 29/04
[52] U.S. Cl. ...................................................... 60/712
[58] Field of Search ........................................... 60/712

[56] References Cited

U.S. PATENT DOCUMENTS

| | | | |
|---|---|---|---|
| 1,424,798 | 8/1922 | Black. | |
| 3,071,921 | 1/1963 | Wild | 60/6 |
| 4,069,670 | 1/1978 | Bratt et al. | 60/517 |
| 4,070,860 | 1/1978 | Hanson | 60/616 |
| 4,074,533 | 2/1978 | Stockton | 60/620 |
| 4,086,771 | 5/1978 | Barrett | 60/616 |
| 4,121,423 | 10/1978 | Querry et al. | 60/616 |
| 4,143,518 | 3/1979 | Kellogg-Smith | 60/712 |
| 4,364,233 | 12/1982 | Stang | 60/712 |
| 4,389,844 | 6/1983 | Ackerman et al | 60/517 |
| 4,478,042 | 10/1984 | Lorant | 60/526 |
| 4,599,863 | 8/1986 | Marttila | 60/616 |
| 4,630,447 | 12/1986 | Webber | 60/712 |
| 4,662,176 | 5/1987 | Fugiwara et al. | 60/526 |
| 4,663,938 | 5/1987 | Colgate | 60/620 |
| 4,671,064 | 6/1987 | White et al. | 60/517 |
| 4,697,420 | 10/1987 | Ishiki et al. | 60/517 |
| 4,712,378 | 12/1987 | Nakayama | 60/625 |
| 4,717,405 | 1/1988 | Budliger | 62/6 |
| 4,742,679 | 5/1988 | Inoda et al. | 60/517 |
| 4,753,072 | 6/1988 | Johansson et al. | 60/517 |
| 4,760,698 | 8/1988 | Bartolini et al. | 60/526 |

Primary Examiner—Allen M. Ostrager
Attorney, Agent, or Firm—Basile and Hanlon

[57] ABSTRACT

A combined internal combustion and hot gas engine employs a working space surrounding a cylinder in an engine block. A piston reciprocates within the cylinder between combustion and expansion ends. A working fluid fills the working space and is moved by a reciprocal displacer mounted within the working space between a hot end adjacent the combustion end of the cylinder to a cold end disposed in fluid flow communication with the expansion side of the piston. The working fluid when heated increases in pressure and acts on the piston to assist in driving the piston between expansion and compression ends of the cylinder. A drive cam reciprocates the displacer in a timed phase relationship with the piston. In one embodiment, the displacer is formed of a regenerative heat transfer material to absorb and give off heat from the working fluid as the working fluid moves between the ends of the working space. In another embodiment, an external regenerative heat exchanger includes a first set of spaced tubes receiving hot exhaust gasses from the cylinder and a second plurality of tubes interposed between the first set of tubes and connected at opposed ends between the hot and cold ends of the working space. An oil distribution system includes crank case chambers separately associated with each combustion cylinder and pressurized by an air pump. An orifice formed in each crank case communicates with a common oil sump. An oil pump distributes oil from the sump to the combustion cylinder in a timed relationship with movement of the piston.

19 Claims, 6 Drawing Sheets

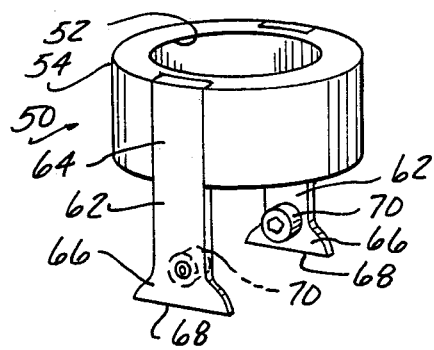
FIG-2
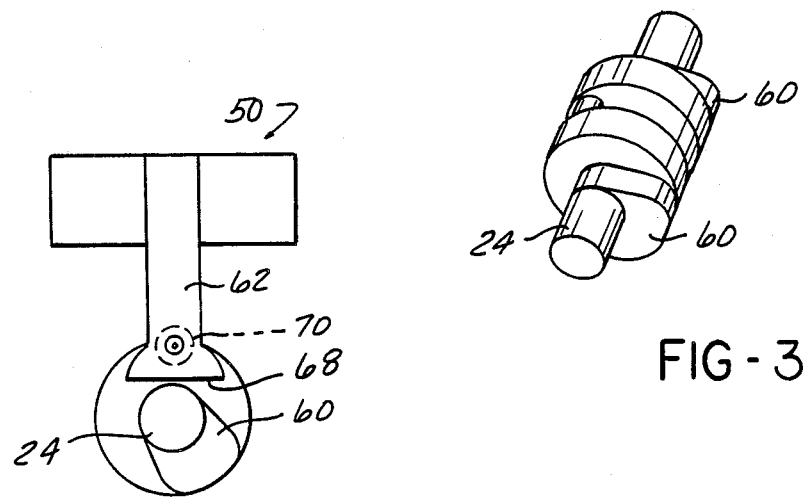
FIG-3
FIG-4
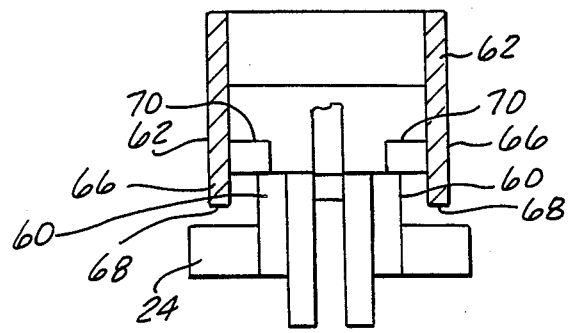
FIG-5

COMBINED INTERNAL COMBUSTION AND HOT GAS ENGINE

BACKGROUND OF THE INVENTION

1. Field of the Invention:

The present invention relates, in general, to internal combustion engines and hot gas or Stirling engines and, more specifically, to combined internal combustion and hot gas engines.

Hot gas engines, such as Stirling engines, utilize repetitive contraction and expansion of heated and cooled intercommunicating gas volumes. In a typical Stirling engine, heat is supplied to a working fluid disposed in a hot, expansion chamber in an engine. Due to the absorbed heat, the working fluid expands and is moved by a reciprocal displacer through a regenerator where it gives up heat to a cold chamber in the engine. Subsequently, the displacer moves the fluid back through the regenerator to the hot chamber to repeat the cycle. Heat is, thus, employed in a Stirling engine to produce work. However, the amount of heat required for efficient operation is high thereby requiring costly high temperature metals. Further, multiple heat exchangers are required which add to the cost and complexity of the engine.

In internal combustion engines, large amounts of heat are wasted. Most of the heat generated by the combustion of fuel is radiated through the engine block, transferred away through the radiator or expelled as hot exhaust gasses. Except for isolated use to pre-heat the fuel, drive a compressor or supercharger, or heat an associated vehicle passenger compartment, such heat is wasted thereby lowering the efficiency of such internal combustion engines.

Attempts have been made to combine an internal combustion engine with a hot gas or Stirling engine in a compound engine which makes better use of the heat generated during fuel combustion. However, certain of such compound engines utilize separate, side-by-side internal combustion cylinders and hot gas cylinders. This results in a large, bulky, heavy engine. Other compound engines utilize only a portion of the heat generated during combustion and thereby have only a moderate increase in efficiency over a conventional internal combustion engine.

Thus, it would be desirable to provide a combined internal combustion and hot gas engine which has increased engine efficiency. It would also be desirable to provide a combined internal combustion and hot gas engine which has a small, compact construction. It would also be desirable to provide a combined internal combustion and hot gas engine which may be produced in any engine configuration, including any number of cylinders and cylinder arrangements.

SUMMARY OF THE INVENTION

The present invention is a combined internal combustion and hot gas engine. The engine includes a cylinder formed in an engine block. A piston reciprocally mounted within the cylinder moves between compression and expansion ends of the cylinder during a working cycle. A working space is formed in the engine block and surrounds the chamber. A hot end of the working space is disposed adjacent the compression end of the cylinder and an opposed cold end of the working space is disposed in fluid flow communication with the expansion end of the cylinder on one side of the piston.

A working fluid fills the working space and is movable between the hot and cold ends of the working space. A displacer reciprocally mounted in the working space moves the working fluid from the hot end of the working space adjacent the compression end of the cylinder to the expansion end of the cylinder. The working fluid picks up heat from the combustion of fuel in the cylinder and increases in pressure to assist in driving the piston toward the combustion end of the cylinder. Finally, the engine of the present invention includes means for reciprocally driving the displacer in a timed phase relation with the piston.

In a preferred embodiment, the working space is concentrically formed about the cylinder in the engine block. The displacer is in the form of an annular ring mounted in the working space. At least one and preferably two cams are mounted on the engine crank shaft and engage cam followers mounted on the displacer to move the displacer in a timed relationship with movement of the piston.

In another embodiment, the engine of the present invention includes regenerator means for removing heat from the working fluid as the working fluid moves from the hot to the cold end of the working space and adding heat to the working fluid as the working fluid moves from the cold to the hot ends of the working space. In a preferred embodiment, the regenerator means comprises forming the displacer of a regenerative heat transfer material. Alternately, the regenerator means may include an external heat exchanger which is connected in fluid flow communication with the combustion end of the cylinder to receive hot exhaust gasses therefrom. The hot exhaust gasses pass through a plurality of spaced, thin cross section tubes between which are interposed a second plurality of thin tubes. The second plurality of thin tubes are connected at one end to the hot end of the working space and at another end to the cold end of the working space and pick up heat from the exhaust gasses to raise the temperature of the working fluid.

In another embodiment, the engine of the present invention is provided with a unique oil collection and distribution system which minimizes oil consumption caused by oil blowby past the piston rings and enhances heat transfer. In this embodiment, the crank case through which the crank shaft of the engine passes is sealed for each combustion cylinder and forms a chamber below each combustion cylinder. An orifice is formed in each crank case chamber and communicates with a common oil sump disposed below the engine block. Means are provided for pressurizing each crank case chamber to a predetermined pressure. Means are also disposed in fluid flow communication with the oil sump and each combustion cylinder and/or displacer for distributing oil from the sump to each cylinder in a timed relationship with the movement of the piston in each combustion cylinder.

The pressurizing means preferably comprises an air pump which supplies pressurized air from outside the engine block to the crank case chamber of each combustion cylinder. This pressure enables oil scavaging by forcing oil in the crank case chamber through the orifice into the sump. In this manner, the crank case for each combustion cylinder is isolated from the sump thereby enabling a crank case to be designed with a minimum volume. In addition, enhanced heat transfer occurs due to the higher density of the working gas caused by the pressurization of the crank case.

The oil distributing means comprises an oil pump disposed in fluid flow communications with the oil sump. The output from the pump is input to a rotor rotatably mounted in a chamber in a housing and communicating with the oil pump. The rotor includes a through bore which communicates with the output of the oil pump and selected outlets in the housing. The outlets in the housing are connected to jets or misting devices in the combustion cylinder or the working space of the engine to spray oil on the combustion cylinder walls and the displacer, respectively.

The oil distributing means is timed in relationship with movement of the piston in each combustion cylinder such that oil is applied to the combustion cylinder walls only during the power stroke of the piston in a combustion cylinder. At this time in the engine cycle, pressure is highest in the combustion chamber of the cylinder which prevents oil blowby past the piston rings into the combustion chamber resulting in excessive oil consumption.

The combined internal combustion and hot gas engine of the present invention has an increased engine efficiency by utilizing heat energy from the internal combustion engine portion to drive the hot gas engine portion in assisting movement of the internal combustion engine piston. The engine has a compact construction due to the mounting of the work space of the hot gas engine portion about the cylinder of the internal combustion engine portion. This results in a small size and low weight which enables the application of the present invention to any engine configuration, size, number of cylinders, etc. The unique oil collection and distribution system of the present engine also maximizes heat transfer and prevents oil blowby past the pistons rings.

BRIEF DESCRIPTION OF THE DRAWING

The various features, advantages and other uses of the present invention will become more apparent by referring to the following detailed description and drawing in which:

FIG. 2 is a perspective view of the displacer employed in the engine shown in FIG. 1;

FIG. 3 is a perspective view of the cam employed to reciprocate the displacer shown in FIG. 2;

FIG. 4 is a side elevational view showing the displacer, the cam and the cam follower;

FIG. 5 is a front, elevational view of the displacer, the cam and the cam follower;

DESCRIPTION OF THE PREFERRED EMBODIMENTS

Figure 6:
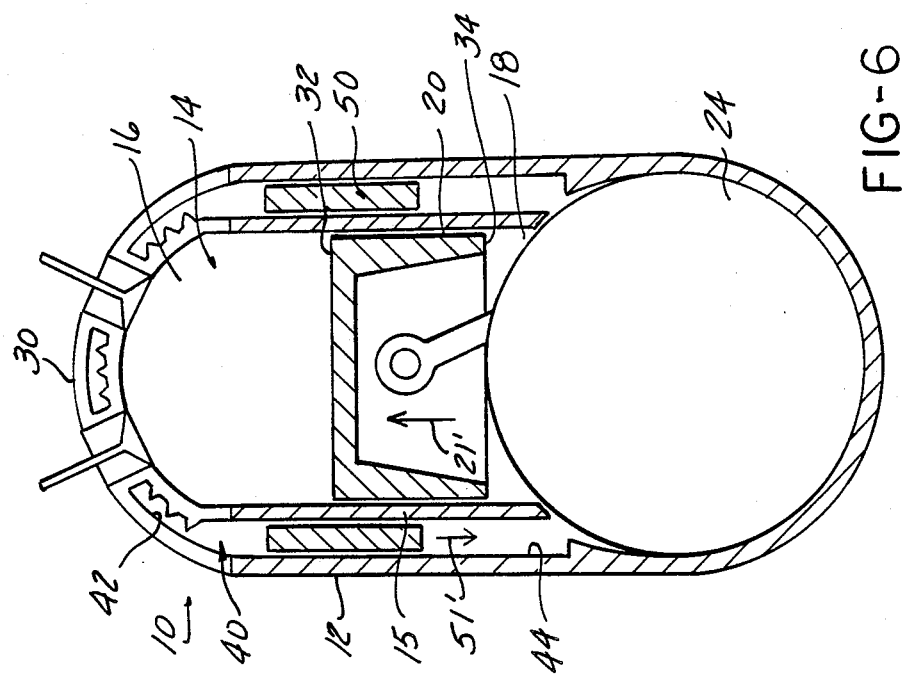
FIG. 6 is a cross sectional view, similar to FIG. 1, but showing the position of the displacer and the piston after the ignition of the combustible fuel mixture in the cylinder.

Throughout the following description and drawing, an identical reference number is used to refer to the same component shown in multiple figures of the drawing.

Figure 1:
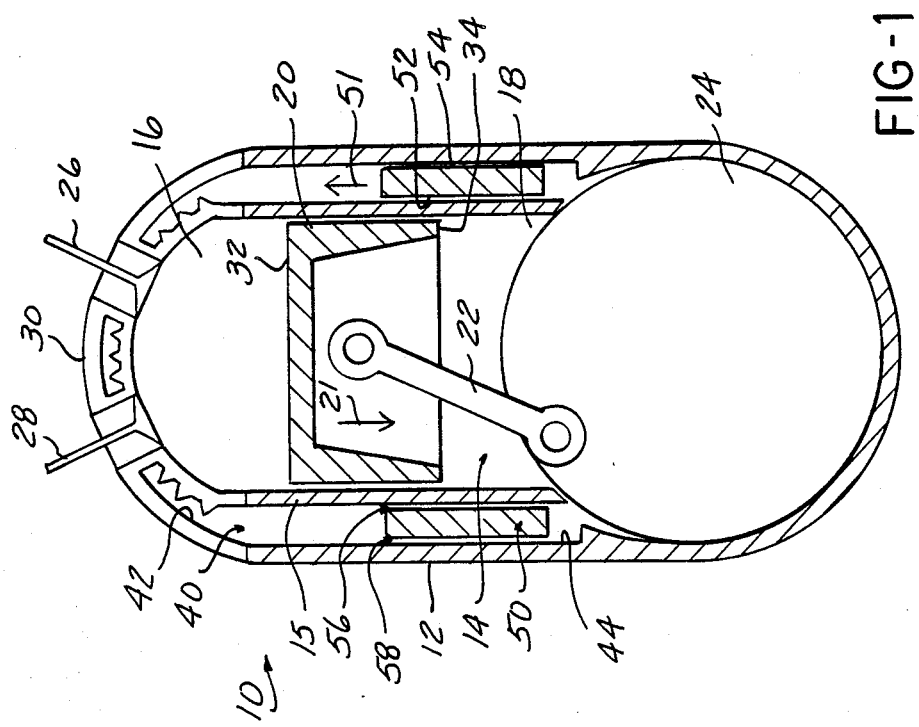
FIG. 1 is a cross sectional view of a combined internal combustion and hot gas engine constructed in accordance with the teachings of the present invention.

Referring now to the drawing, and to FIG. 1 in particular, there is illustrated a combined internal combustion and hot gas engine 10 constructed in accordance with the teachings of the present invention. The engine 10 is depicted as a single cylinder; but it will be understood that the teachings of the present invention apply to any size engine having any number of cylinders and cylinder configurations, as described and illustrated hereafter.

The engine 10, as shown in FIG. 1, includes an engine block 12. A hollow cylinder denoted in general by reference number 14 is formed in the block 12. The cylinder 14 has a circular cross section and is provided with a combustion end 16 and an expansion end 18.

A piston denoted by reference number 20 is reciprocally mounted within the cylinder 14. The piston 20 has a circular cross section and is connected by a piston rod 22 to a crank shaft 24. The piston 20 reciprocates within the cylinder 14 between the combustion end 16 and the expansion end 18 in a timed relationship with movement of intake and exhaust valves 26 and 28, respectively, mounted in a cylinder head 30 at the upper or combustion end of the cylinder 14. For clarity, O-rings employed with the piston 20 are not depicted in the drawing. The piston 20 is formed with a first or upper surface 32 which faces the combustion end 16 of the cylinder 14 and a second opposed surface 34.

The hot gas portion of the engine 10 comprises a working space denoted in general by reference number 40. The working space 40 is in the form of an annular cavity concentrically disposed about and surrounding the cylinder 14. As shown in FIG. 1, the working space 40 is formed between the engine block portion 12 and the side walls 15 of the engine block 12 forming the cylinder 14.

The working space 40 includes a hot end 42 disposed adjacent to the combustion end 16 of the cylinder 14 and a cold end 44 disposed adjacent the expansion end 18 of the cylinder 14. As shown in FIG. 1, the hot end 42 of the working space 40 is formed at the upper end of the working space 40 and includes passages formed in and extending through the head 30 attached to the engine block 12 which are disposed in heat transfer relationship with the combustion end 16 of the cylinder 14.

The hot end 42 may also be insulated to enhance thermal efficiency.

The cold end 44 of the working space 40 is disposed in fluid flow communication with the expansion end 18 formed in the lower portion of the engine block 12. The expansion end 18 in the engine 10 is defined by the second surface 34 of the piston 20, the side walls 15 of the cylinder 14 and the lower portion of the engine block 12. The cold end 44 of the working space 40 can be cooled via heat transfer with outside air, or by coolant water, oil or other fluid.

A working fluid, such as air, is disposed within and fills the working space 40. The working fluid is moved between the hot end 42 and the cold end 44 as described hereafter.

A displacer 50 is reciprocally mounted in the working space 40 between the engine block wall 12 and the side wall 15 of the cylinder 14. As shown in FIGS. 1 and 2, the displacer 50 is in the form of a thin, annular ring having an inner surface 52 and an outer surface 54. The thickness of the ring is slightly less than the width of the working space 40 to form thin fluid flow passages 56 and 58, shown in FIG. 1, between the inner and outer surfaces 52 and 54, respectively, of the displacer 50 and the adjacent cylinder wall 15 and engine block 12 for the flow of working fluid thereover.

Means are provided for reciprocally driving the displacer 50 in a timed phase relationship with the piston 20. The displacer driving means, in a preferred embodiment of the present invention, comprises a cam 60 and a cam follower 62.

As shown in FIGS. 3, 4 and 5, the cam 60 is mounted on the engine crankshaft 24 and includes a lobe portion which engages the cam follower 62. The shape and location of the lobe portion of the cam 60 is selected to reciprocally drive the displacer 50 in the desired timed phase relationship with the piston 20.

The cam follower 62, as shown in FIGS. 2, 4 and 5, is in the form of an elongated strip joined at an upper end 64 to the displacer 50. The opposite end 66 of the cam follower 62 is straight or, as as shown in FIGS. 2 and 4, has an enlarged, outwardly flared end portion terminating in an edge 68. A roller 70 is mounted on lower portion 66 of the cam follower 62 and engages the cam 60 to reciprocally drive the displacer 50 between the hot and cold ends 42 and 44, respectively, of the working space 40.

Although a single cam 60 and a single cam follower 62 may be employed as the displacer driving means, for balance, it is preferred that a pair of cam followers 62 be mounted on opposite sides of the displacer 50, each of which is engageable with a separate cam 60 mounted on the crank shaft 24 of the engine. Alternately, cranks, eccentric rods or other suitable means may be employed as the displacer driving means.

The piston rod 22 is connected to the crank shaft 24 causing rotation of the crank shaft 24 as the piston 20 reciprocates within the cylinder 14 as is conventional in the operation of internal combustion engines. The rotation of the crank shaft 24 causes rotary movement of the cam 60 about the axis of the crank shaft 24 to reciprocally move the displacer 50 within the working space 40.

In operation, the engine 10, as shown in FIG. 1, is depicted with the piston 20 beginning a downward movement after ignition of a combustible fuel mixture in the combustion end 16 of the cylinder 14. At this time, the displacer 50 through the cam 60 has moved a short distance upward from the cold end 44 of the working space 40.

Upon ignition of the combustible fuel mixture in the combustion end 16 of the cylinder 14, the piston 20 is forced downward within the cylinder 14 in the direction of arrow 21 and passes through the position shown in solid in FIG. 1. The heat generated during the combustion of the fuel mixture radiates outward from the cylinder 14 into the hot end 42 of the working space 40 and is absorbed by the working fluid disposed in the hot end 42. As the piston 20 moves downward within the cylinder 14, the cam 60 and crank shaft 24 urge the displacer 50 upward in the direction of arrow 51 within the working space 40 through the position shown in solid in FIG. 1.

The working fluid in the hot end 42 of the working space 40 expands due to the increase in its temperature and creates a high pressure in the working space 40. The heated working fluid in the hot end 42 flows or is forced by the advancing displacer 50 through the fluid flow paths 56 and 58 formed between the inner and outer surfaces 52 and 54, respectively, of the displacer 50 and the adjoining side walls 15 of the cylinder and the engine block 12 into the cold end 44 of the working space 40. The high pressure of the working fluid acts on the second surface 34 of the piston 20 as the piston 20 begins to move upward as shown by arrow 21' in FIG. 6 from bottom dead center assisting the upward movement of the piston 20.

Figure 11:
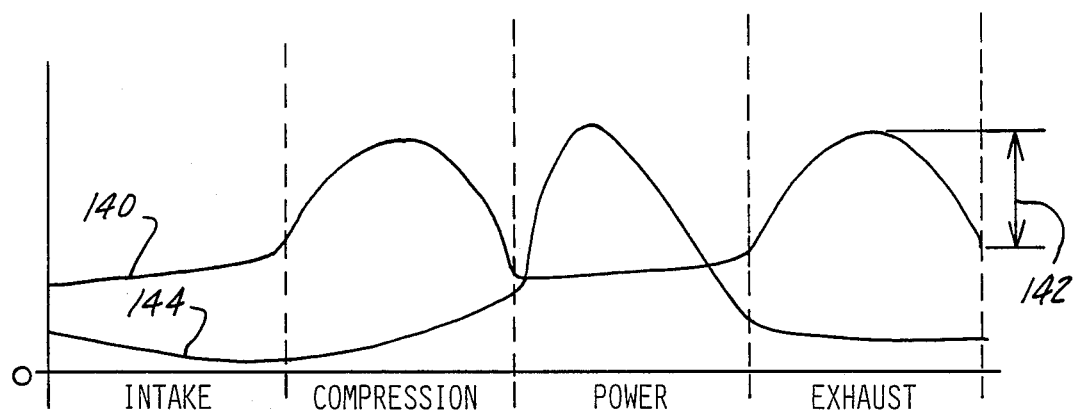
FIG. 11 is a chart showing internal combustion cylinder pressure and external combustion cylinder pressure during the various stages of an engine cycle.

This is clearly shown in FIG. 11 which depicts the external chamber pressure 140 or the pressure acting on the second surface 34 of the piston 20 during each of the four strokes of one cycle of the engine. As shown in FIG. 11, during the compression and exhaust cycles, the external pressure is highest as indicated by reference number 142 which depicts the mean effective pressure assisting the upward movement of the piston 20. This pressure increase results solely from the pressure increase of the working fluid in the working space 40.

Simultaneously with upward movement of the piston 20, the displacer 50 moves downward in the direction of arrow 51' in FIG. 6 from the terminus of the hot end 42 of the working space 40 toward the cold end 44 and forces the working fluid into the hot end 42 for the next engine cycle. Thus, the heat generated during combustion is translated by the working fluid of the hot gas portion of the engine 10 into a driving force which assists the upward movement of the piston 20 in its cyclic operation thereby increasing the overall efficiency of the engine 10. This cycle is repeated during the conventional four stroke movement of the piston 20.

Figure 7:
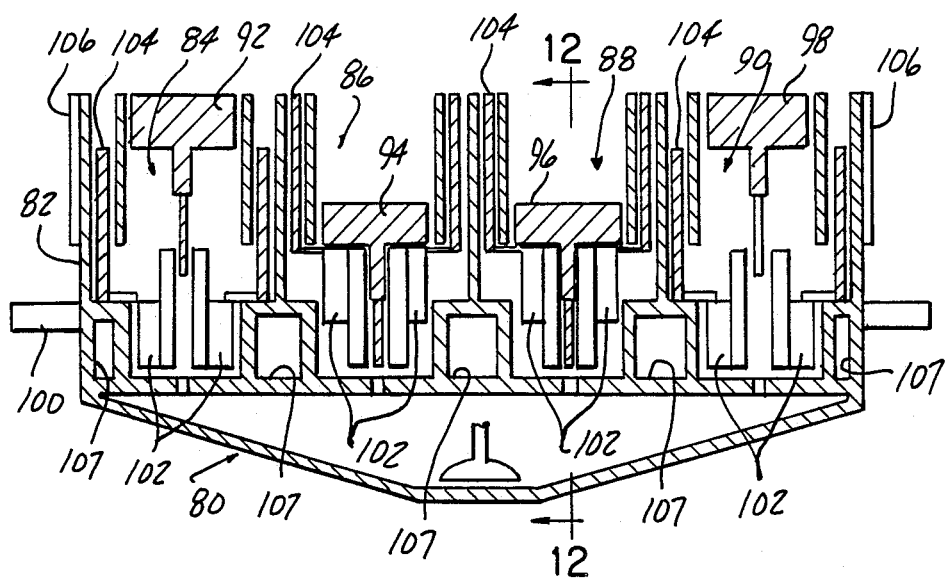
FIG. 7 is a cross sectional view of a multi-cylinder engine constructed in accordance with the teachings of the present invention.

FIG. 7 depicts the combined internal combustion and hot gas engine of the present invention configured in an in-line four cylinder configuration. The engine 80 includes a block 82 having four, side-by-side, in-line arranged cylinders 84, 86, 88 and 90 formed therein. Reciprocal pistons 92, 94, 96 and 98 are reciprocally mounted in each of the cylinders 84, 86, 88 and 90, respectively. The pistons 92, 94, 96 and 98 are depicted in FIG. 7 at various stages in their cyclic operation including compression, power, intake and exhaust. Each of the pistons 92, 94, 96 and 98 is rotatably connected to a crank shaft 100 which extends through the engine block 82. Also connected to the crank shaft 100 are cams denoted in general by reference number 102 associated with each cylinder 84, 86, 88 and 90 which drive displacers 104 surrounding each cylinder in the same manner as described above. The cams 102 reciprocally move their associated displacer 104 in a timed phase relationship with the associated piston, such as pistons 92, 94, 96 and 98. An external jacket of insulation 106 is placed about the engine block 82 to conserve heat generated during the operation of the engine 80. Water cooling passages 107 are formed in the block 82 to cool the cold end of each working space about each cylinder.

It will be understood that the teachings of the present invention may be applied to any engine configuration, including any number of cylinders and any type of cylinder arrangement, such as in-line, vee, etc.

In a preferred embodiment of the present invention, the combined internal combustion and hot gas engine 10 includes regenerator means for conserving heat in the engine and maintaining the temperature of the working fluid at an elevated level. In one embodiment, the regenerator means comprises forming the displacer 50, shown in FIG. 1, of a regenerative, heat transfer material. This material is adapted to absorb heat from the working fluid as the working fluid moves from the hot end 42 to the cold end 44 in the working space 40 and to give up such absorbed heat to the working fluid as the working fluid passes in a return cycle from the cold end 44 to the hot end 42. In this manner, the temperature of the working fluid is maintained at a higher level for increased efficiency and less heat loss.

Figure 8:
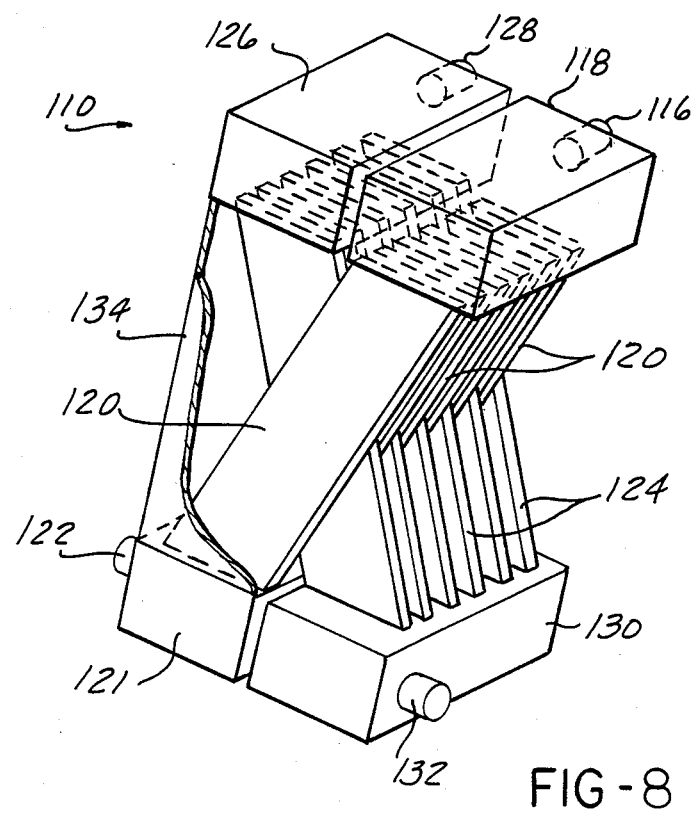
FIG. 8 is a perspective view of an external heat regenerator employed in one embodiment of the present invention.
Figure 9:
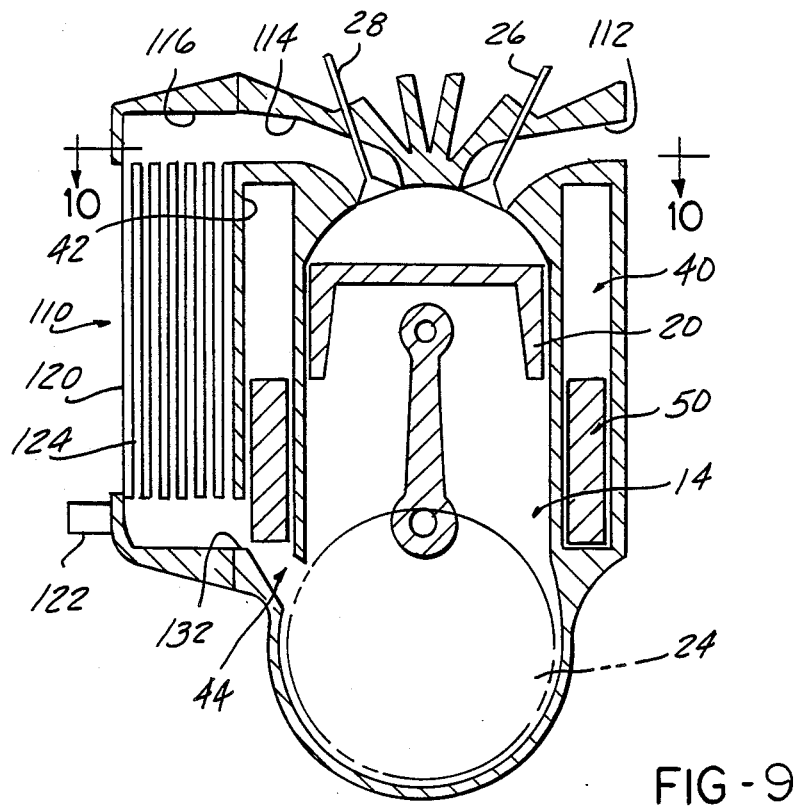
FIG. 9 is a side elevational view of the external heat regenerator shown in FIG. 8.
Figure 10:
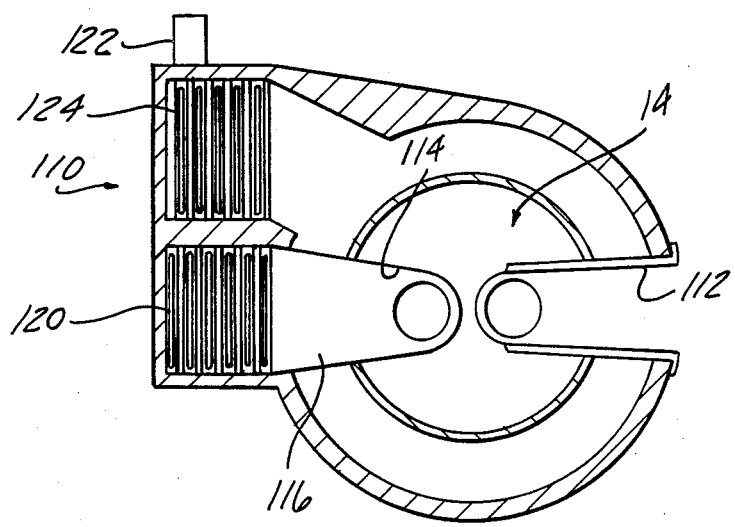
FIG. 10 is a plan, cross sectional view of the engine and external heat regenerator, generally taken along line 10—10 in FIG. 9.

Another embodiment of the regenerator means is illustrated in FIGS. 8, 9 and 10. In this embodiment, the regenerator comprises an external, heat exchanger regenerator utilizing the exhaust gas heat generated in the internal combustion cylinder 14 of the engine 10.

As shown in FIG. 8, the external regenerator includes a heat exchanger 110 which provides heat transfer from the hot exhaust gasses exhausted from the cylinder 14 to the working fluid. As shown in FIGS. 8, 9 and 10, the external regenerator 110 includes an intake port 112 and an exhaust port 114 formed in the head 30 of the cylinder 14. The exhaust port 114 is connected to a first conduit 116 which terminates in a first header 118. A first group or set of thin tubes 120 are connected at one end to the header 118 and at a second opposed end to another header 121. An exhaust outlet 122 is formed in the second header 121 and connected to the exhaust manifold of the engine to exhaust the exhaust gasses from the cylinder 14. Thus, the exhaust gasses generated during combustion of the fuel mixture in the cylinder 14 pass through the exhaust port 114 and first conduit 116 into the first header 118 of the heat exchanger 110. The gasses further pass through the tubes 120 to the second header 121 and exhaust port 122 to be exhausted from the engine.

A second plurality or set of thin tubes 124 are spacedly interposed between the tubes 120 in a heat exchange relationship. A first end of the tubes 124 communicate with a header 126 disposed by a conduit 128 in fluid flow communication with the working space 40. The second end of each of the tubes 124 communicates in fluid flow communication with a header 130 which communicates through a conduit 132 to the cold end 44 of the working space 40. The operation and construction of the displacer 50, in this embodiment, is identical to that described above and illustrated in FIG. 1.

Through the use of the external heat exchanger 110, heat energy in the exhaust gasses is absorbed by the working fluid as the working fluid shuttles between the hot and cold ends 42 and 44 of the working space 40. This maintains the temperature of the working fluid at an elevated level to conserve energy and increase the efficiency of the engine. An outer layer 134 of an heat insulating material is disposed about the interposed tubes 120 and 124 to further conserve heat.

In order to understand another embodiment of the present invention depicted in FIGS. 12–16, reference should be had to the chart shown in FIG. 11 which illustrates the external combustion chamber pressure 140 and the internal combustion chamber pressure 144 during various stages or strokes of a single engine cycle of one piston in a combustion cylinder. As can be seen in FIG. 11, the pressure within the combustion chamber reaches a maximum during the power stroke of the engine. At all other times, the pressure within the combustion chamber is less than the external pressure acting on the second surface 34 of the piston 20. In this embodiment, oil is distributed to the cylinder wall during the power stroke of the engine to prevent oil blowby past the piston rings into the combustion chamber which previously has resulted in excessive oil consumption.

As shown in FIG. 7, the crank case portion of the engine through which the crank shaft 24 extends is formed as a sealed chamber below and in communication with each combustion cylinder. The crank case portions are separate and isolated from each other for each combustion cyclinder of the engine.

Figure 12:
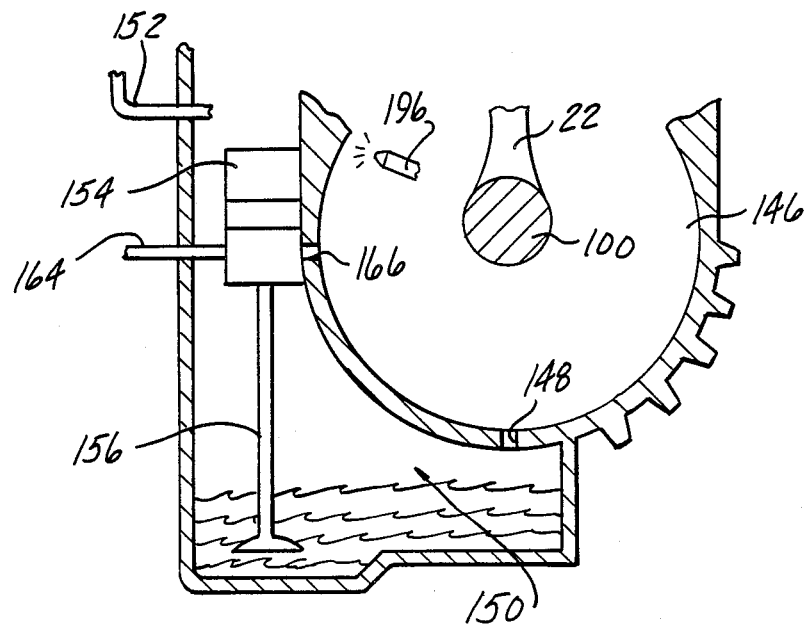
FIG. 12 is a cross sectional view generally taken along line 12—12 in FIG. 7.

As shown in detail in FIG. 12, the crank case chamber 146 for one of the combustion cyclinders of the engine shown in FIG. 7 is provided with an orifice 148 formed at a bottom portion thereof. The orifice 148 has a small cross section in comparison to the volume of gasses transferred during the heat cycle of the engine and disposes the crank case chamber 146 in fluid flow communication with an oil sump 150. The sump 150 is located below and to the side of the engine and is formed with a housing suitably connected to or formed with the engine block. The sump 150 collects oil flowing from each combustion crank case chamber of the engine. As is conventional, a conduit 152 is mounted in the sump 150 and connected to a conventional PCV valve to vent contaminants from the sump 150.

Figure 13:
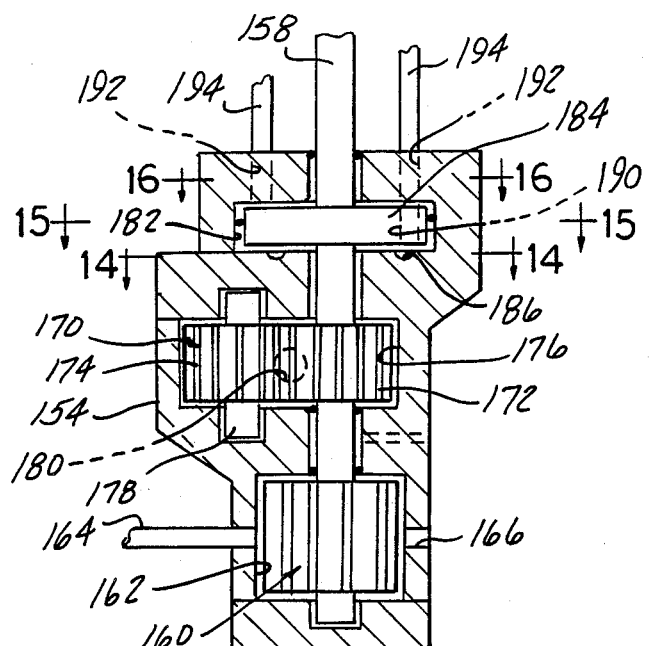
FIG. 13 is a cross sectional view of the air pump and oil distribution means shown generally in FIG. 12.
Figure 14:
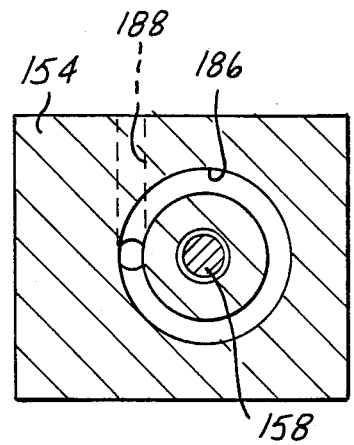
FIG. 14 is a cross sectional view generally taken along line 14—14 in FIG. 13.
Figure 15:
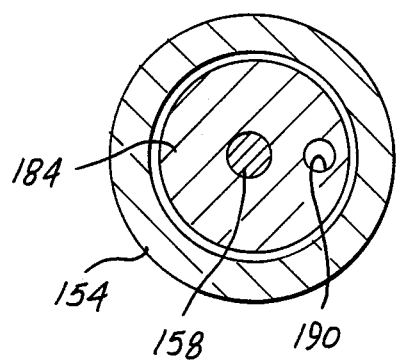
FIG. 15 is a cross sectional view generally taken along line 15—15 in FIG. 13.

The embodiment of the engine shown in FIG. 12 includes means for pressurizing the crank case chamber 146 to a predetermined pressure and means for distributing oil from the sump 150 to the cylinder wall in a timed relationship with movement of the piston 20. As such, a housing 154 is disposed in fluid flow communication with the sump 150 by an intake conduit 156 which extends from the housing 154 into a lower portion of the oil sump 150. As shown in FIG. 13, a drive means, such as a drive shaft 158, extends into the housing 154. The drive shaft 158 is driven by the engine, such as the engine cam shaft, crank shaft or other means, to provide rotation of the elements contained within the housing 154. Suitable bearings and seals are also provided for sealingly and rotatably mounting the end of the drive shaft 158 in the housing 154.

The means for pressurizing the crank case chamber 146 comprises an air pump means 160 mounted within the housing 154. The air pump means 160 preferably comprises a vane-type pump fixedly connected to the drive shaft 158 and rotatable therewith. The vane type pump is mounted within a sealed chamber 162 formed within the housing 154. An inlet 164 is connected in communication with the chamber 162 to provide external air to the chamber 162. An outlet 166 disposes the chamber 162 in communication with the crank case chamber 146 as shown in FIG. 12. In this manner, pressurized air is injected into the crank case chamber 146 to pressurize the crank case chamber 146 to a predetermined pressure for reasons which will be described in greater detail hereafter.

It should be noted that although only a single combustion cylinder and a single crank case chamber 146 are illustrated in FIG. 12, the output from the air pump means 146 may be connected by a suitable manifold formed of discrete conduits or internal bores formed in the housing 154 which are connected to each cylinder and crank case chamber of the engine.

The means for distributing oil from the sump 150 to the crank case chamber 146 in the engine includes an oil pump means denoted in general by reference number 170. Preferably, the oil pump means 170 comprises a gear-type pump formed of two meshing gears 172 and 174. Oil squeezed through the meshing teeth or faces of the gears 172 and 174 is pressurized. The oil pump means 170 is housed within a chamber 176 formed in the housing 154. The gear 174 is rotatably mounted on a shaft 178 rotatably fixed at opposite ends to the housing 154 by suitable means, such as bearings, etc. The other gear 172 is fixedly connected to and rotated by the drive shaft 158.

As shown in FIGS. 12 and 13, the conduit 156 from the oil sump 150 is connected to an inlet 180 formed in the housing 154 and communicates with the chamber 176 surrounding the oil pump means 170. Thus, oil from the sump 150 is drawn into the chamber 176 under a vacuum created by the oil pump means 170. The oil is forced from the chamber 176 to a second chamber 182 also formed in the housing 154. The chamber 182 surrounds a rotatable disk or rotor 184 which is fixedly connected to and rotated by the drive shaft 158. An open-ended annular groove 186 is formed in the housing 154 and faces the chamber 182. Oil under pressure from the oil pump means 170 flows through a conduit 188 in the housing 154, shown in FIG. 14, into the annular groove 186.

This embodiment of the present invention includes means for distributing the oil in a timed relationship with the movement of the piston in the combustion chamber 146 of the engine and/or the displacer 50 surrounding the piston in each combustion chamber. Preferably, the rotor 184 includes a through bore 190. One end of the bore 190 faces the annular groove 186 formed in the housing 154 to receive oil supplied to the annular groove 186 by the oil pump means 170.

Figure 16:
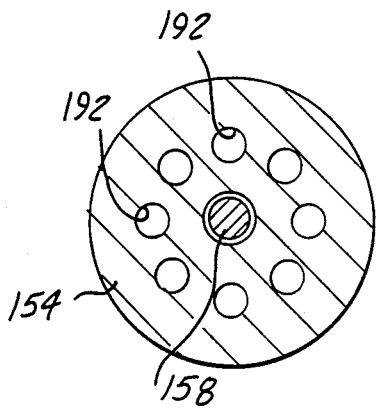
FIG. 16 is a cross sectional view generally taken along line 16—16 in FIG. 13.

As shown in FIGS. 13 and 16, a plurality of outlets 192 are formed in the end of the housing 154. The outlets 192 are in the form of circumfrentially spaced bores formed in the housing 154 which face the rotor 184 and are disposed in fluid flow communication with the chamber 182 in the housing 154. Rotation of the rotor 184 brings the bore 190 in the rotor 184 in communication with successive outlets 192 thereby allowing selected distribution of the oil from the oil pump means 170 through each of the outlets 192. Suitable conduits as shown generally by reference number 194 in FIG. 13 are connected to the outlets 192 at one end and at another end to a suitable jet or misting device, such as that denoted by reference number 196 in FIG. 12 which sprays a fine mist of oil to the cylinder wall of the engine. Other conduits 194 can be used to supply oil to the bearings of the engine. The conduits 194 may be discrete tubes or internal bores formed in the engine block which are connected to the outlets 192 in the housing 154.

Preferably, one jet 196 is disposed within the combustion cylinder, as shown in FIG. 12, to spray a mist of oil onto the cylinder walls. As noted above, such oil spray is provided only during the power stroke of the engine when the combustion chamber side of the piston is at a higher pressure than the external chamber pressure acting on the opposite or second side of the piston. This prevents oil blowby past the piston rings thereby minimizing oil consumption by the engine. Another one of the outlets 192 may be connected by a conduit 194 to supply oil to the displacer 50 associated with a particular piston.

In summary, there has been disclosed a unique combined internal combustion and hot gas engine which has increased efficiency over conventional internal combustion engines, conventional hot gas or Stirling cycle engines or previously constructed combined internal combustion and hot gas engines. The combined engine of the present invention uniquely disposes a hot gas working space concentrically about an internal combustion engine cylinder thereby resulting in a small, compact engine which exhibits the advantage of both internal combustion engines and hot gas engines. Further, the heat of the exhaust gas from the internal combustion cylinder is utilized by the working fluid in the working space to assist the upward driving motion of the piston to increase the efficiency of the engine. Regenerative heat features are provided by forming the displacer in the engine from a regenerative, heat transfer material or by use of an external, regenerative heat exchanger utilizing the hot exhaust gasses as a heat transfer medium with the working fluid.

The engine of the present invention also includes a unique oil collection and distribution system which supplies oil from separate crank cases associated with each combustion cylinder of the engine to the cylinder walls and/or displacer of each cylinder in a timed relationship with movement of the piston within a particular cylinder. In this manner, oil is provided to selected portions of the engine during the power stroke of the piston to minimize oil blowby thereby decreasing oil consumption within the engine and maximizing heat transfer.

What is claimed is:

1. A combined internal combustion and heat engine having an engine block, the engine comprising:
    a combustion cylinder formed in the engine block;
    a piston reciprocally mounted within the cylinder and movable between compression and expansion ends of the cylinder;
    a working space formed in the engine block surrounding the cylinder, the working space disposed in fluid flow communication with the cylinder on one side of the piston and having a hot end disposed adjacent the combustion end of the cylinder and a cold end disposed in fluid flow communication with the expansion end of the cylinder;
    a working fluid filling the working space;
    a displacer reciprocally mounted in the working space for moving the working fluid from the hot end of the working space adjacent the compression end of the cylinder, wherein the working fluid picks up heat from the combustion end of the cylinder, through the working space to the cold end of the working space and into the expansion end of the cylinder; and means for reciprocally driving the displacer in a timed phase relation with the piston.

2. The engine of claim 1 wherein the working space is concentrically formed about the cylinder.

3. The engine of claim 2 wherein the displacer is in the form of an annular ring.

4. The engine of claim 1 wherein the piston rotates a crank shaft mounted within the engine block and the displacer driving means comprises:
- a cam mounted on the crank shaft; and
- a cam follower mounted on the displacer and engaging the cam.

5. The engine of claim 4 further including:
- two cams spacedly mounted on the crank shaft; and
- two cam followers, each mounted at one end on the displacer and respectively engaging one of the cams at another end.

6. The engine of claim 1 further including:
- regenerator means for removing heat from the working fluid as the working fluid moves from the hot end to the cold end of the working space and adding heat to the working fluid as the working fluid moves from the cold end to the hot end of the working space.

7. The engine of claim 6 wherein the regenerator means comprises:
- the displacer being formed of a regenerative, heat transfer material.

8. The engine of claim 1 further including:
- external regenerative means connected in fluid flow communication with the combustion end of the cylinder to receive hot exhaust gasses therefrom; and
- the working space being disposed in heat transfer relationship with the exhaust gasses in the external regenerative means to absorb heat therefrom.

9. The engine of claim 8 wherein the external regenerative means comprises:
- a first conduit disposed in fluid flow communication at one end with the combustion end of the cylinder;
- a first plurality of spaced tubes disposed in fluid flow communication with the first conduit;
- a second conduit disposed in fluid flow communication with the hot end of the working space;
- a second plurality of spaced tubes interposed between the spaced tubes of the first plurality of tubes in heat transfer relation therewith to absorb heat therefrom and connected in fluid flow communication with the second conduit; and
- a third conduit connecting the second plurality of tubes in fluid flow communication with the cold end of the working space.

10. A combined internal combustion and heat engine having an engine block and a rotatable crank shaft, the engine comprising:
- a combustion cylinder formed in the engine block;
- a piston reciprocally mounted within the cylinder and movable between compression and expansion ends of the cylinder;
- a working space formed in the engine block concentrically about the cylinder, the working space disposed in fluid flow communication with the cylinder on one side of the piston and having a hot end disposed adjacent the combustion end of the cylinder and a cold end disposed in fluid flow communication with the expansion end of the cylinder;
- a working fluid filling the work space;
- an annular displacer reciprocally mounted in the working space for moving the working fluid from the hot end of the working space adjacent the compression end of the cylinder, wherein the working fluid picks up heat from the combustion end of the cylinder, through the working space to the cold end of the working space and into the expansion end of the cylinder;
- a cam mounted on the engine crank shaft;
- a cam follower mounted on the displacer and engaging the cam to reciprocally drive the displacer between the hot and cold ends of the working space in a timed phase relation with the piston; and
- regenerator means for removing heat from the working fluid as the working fluid moves from the hot end to the cold end of the working space and adding heat to the working fluid as the working fluid moves from the cold end to the hot end of the working space.

11. The engine of claim 10 further including:
- two cams spacedly mounted on the crank shaft; and
- two cam followers, each mounted at one end on the displacer and respectively engaging one of the cams at another end.

12. The engine of claim 10 wherein the regenerator means comprises:
- the displacer being formed of a regenerative, heat transfer material.

13. The engine of claim 10 further including:
- external regenerative means connected in fluid flow communication with the combustion end of the cylinder to receive hot exhaust gasses therefrom; and
- the working space being disposed in heat transfer relationship with the exhaust gasses in the external regenerative means to absorb heat therefrom.

14. The engine of claim 13 wherein the external regenerative means comprises:
- a first conduit disposed in fluid flow communication at one end with the combustion end of the cylinder;
- a first plurality of spaced tubes disposed in fluid flow communication with the first conduit;
- a second conduit disposed in a fluid flow communication with the hot end of the working space;
- a second plurality of spaced tubes interposed between the spaced tubes of the first plurality of tubes in heat transfer relation therewith to absorb heat therefrom and connected in fluid flow communication with the second conduit; and
- a third conduit connecting the second plurality of tubes in fluid flow communication with the cold end of the working space.

15. A combined internal combustion and heat engine having an engine block with a crank shaft extending therethrough comprising:
- a combustion cylinder formed in the engine block, a crank case formed in the engine clock below and in communication with the cylinder and receiving the crank shaft therethrough;
- a piston reciprocally mounted within the combustion cylinder and connected to the crank shaft for movement between compression and expansion ends of the combustion cylinder;
- a working space formed in the engine block surrounding the cylinder, the working space disposed in fluid flow communication with the cylinder on one side of the piston and having a hot end disposed adjacent the combustion end of the cylinder and a cold end disposed in fluid flow communication with the expansion end of the cylinder;

a working fluid filling the working space;

a displacer reciprocally mounted in the working space for moving the working fluid from the hot end of the working space adjacent the compression end of the cylinder, wherein the working fluid picks up heat from the combustion end of the cylinder, through the working space to the cold end of the working space and into the expansion end of the cylinder to drive the piston toward the combustion end of the cylinder;

means for reciprocally driving the displacer in a timed phase relation with the piston;

an oil sump;

an orifice formed in the crank case and disposing the oil sump and the crank case in fluid flow communication;

means for pressurizing the crank case; and means, disposed in fluid flow communication with the oil sump and the combustion cylinder, for distributing oil from the oil sump to the combustion cylinder in a timed relationship with movement of the piston.

16. The engine of claim 15 wherein the means for pressurizing the crank case comprises:

air pump means disposed in fluid flow communication between a source of air and the crank case for pumping pressurized air into the crank case.

17. The engine of claim 15 wherein the oil distributing means comprises:

oil pump means disposed in fluid flow communication with the oil sump for pumping oil from the oil sump;

means for driving the oil pump means; and a distributor connecting the oil pump means and the combustion cylinder in fluid flow communication for distributing oil to the combustion cylinder.

18. The engine of claim 15 including:

a housing containing the pressurizing means and the oil distributing means;

the oil distributing means comprising:

a rotor rotatably mounted within the housing and fixedly connected to and rotatable with the driving means;

a chamber formed in the housing and disposed in fluid flow communication with the sump at one end and the rotor at another end;

the oil pump means disposed in the chamber;

an annular groove formed in the housing and disposed in fluid flow communication with the chamber and the rotor;

a through bore formed in the rotor and disposed in fluid flow communication with the annular groove in the housing; and an outlet formed in the housing and disposed in fluid flow communication with the combustion cylinder, the outlet disposed in fluid flow communication with the bore in the rotor to distribute oil from the oil pump means to the combustion cylinder in a timed relationship with movement of the piston.

19. The engine of claim 18 further including:

a plurality of outlets formed in the housing, one outlet disposed in fluid flow communication with the combustion cylinder and another outlet disposed in fluid flow communication with the working space to distribute oil over the displacer in the working space.

* * * * *